United States Patent [19]

Kägi et al.

[11] 4,375,822
[45] Mar. 8, 1983

[54] DEVICE FOR DETACHABLE COUPLING A BRANCHLINE TO A PRESSURE LINE

[75] Inventors: Bruno Kägi, Meilen; Georg Hirmann, Zurich; Rolf Luginbühl, Kusnacht, all of Switzerland

[73] Assignee: Bachofen AG, Uster, Switzerland

[21] Appl. No.: 298,736

[22] Filed: Sep. 2, 1981

Related U.S. Application Data

[62] Division of Ser. No. 68,879, Aug. 22, 1979, Pat. No. 4,296,775.

[30] Foreign Application Priority Data

Nov. 27, 1978 [CH] Switzerland .................. 12139/78
Apr. 17, 1979 [CH] Switzerland .................. 3595/79
Jul. 20, 1979 [CH] Switzerland .................. 6788/79

[51] Int. Cl.³ .................. F16L 29/00; F16L 37/28
[52] U.S. Cl. .................. 137/322; 137/580; 222/506; 222/509; 251/25; 251/149
[58] Field of Search .................. 137/322, 580; 222/506, 222/507, 509; 239/569; 251/25, 149

[56] References Cited

U.S. PATENT DOCUMENTS

| | | | |
|---|---|---|---|
| 951,519 | 3/1910 | Bacigalupi | 137/322 |
| 2,798,506 | 7/1957 | Baker et al. | 137/580 |
| 3,012,574 | 12/1961 | Baker et al. | 137/580 |
| 3,195,562 | 7/1965 | Nelson et al. | 137/322 |
| 3,310,067 | 3/1967 | Meyer | 137/580 |
| 3,326,234 | 6/1967 | Baker et al. | 137/580 |
| 3,580,401 | 5/1971 | Stahl | 137/580 |
| 4,216,794 | 8/1980 | Standal | 137/322 |

FOREIGN PATENT DOCUMENTS

| | | |
|---|---|---|
| 2262488 | 9/1975 | France . |
| 1481102 | 7/1974 | United Kingdom . |

*Primary Examiner*—George L. Walton

[57] ABSTRACT

A device for detachably coupling the orifice of a branchline to a conduit carrying a pressure medium having a plurality of discharge valves disposed spaced apart from each other along said conduit. Each of the valves has a discharge opening, and a closing element for each of said openings. A coupling device has the orifice disposed therein and is longitudinally displaceable along the conduit and connectable with the conduit by opening one of the discharge valves. The coupling device has a coupling element which is guided on the conduit and an automatically sealing coupling in the coupling position with the discharge valve at the pressure side for an automatic alignment with the orifice, and an actuator effective to actuate a respective one of the discharge valves in the coupling position of the coupling element.

2 Claims, 10 Drawing Figures

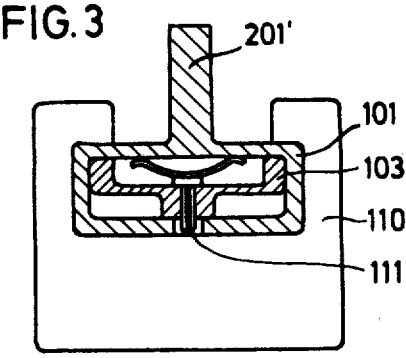
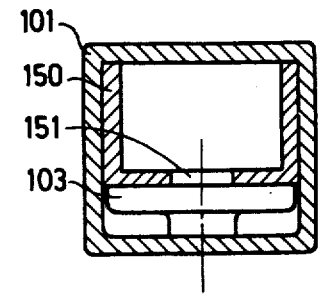
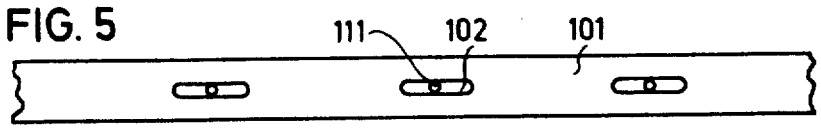
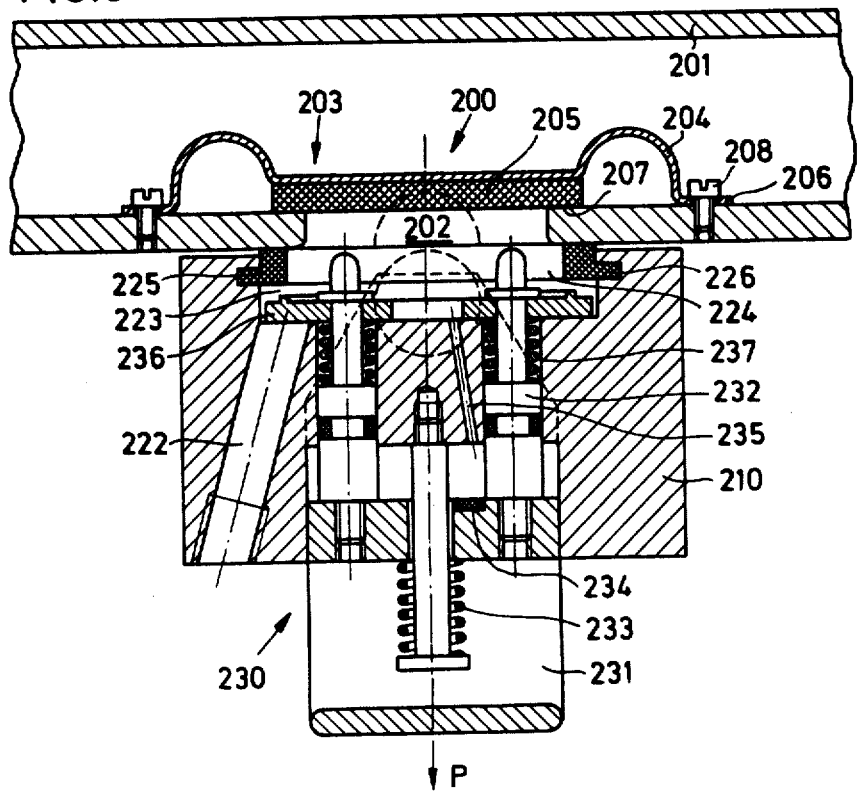

DEVICE FOR DETACHABLE COUPLING A BRANCHLINE TO A PRESSURE LINE

This is a division of application Ser. No. 068,879, filed Aug. 22, 1979, now U.S. Pat. No. 4,296,775.

BACKGROUND OF THE INVENTION

The invention relates to a device for detachably coupling the orifice of a branchline to a line carrying a pressure medium and having a plurality of discharge valves disposed in spaced relationship with respect to each other on the line, and a discharge opening each closeable by a closing element. The orifice is disposed in a coupling device displaceable longitudinally of the pressure line and is connectable with the line by opening one of the discharge valves.

Coupling devices are known which are fixedly mounted on a branch of a pressure line. In such pressure lines the coupling is carried out by means of a coupling member which is inserted against the pressure and which is removed for decoupling. The disadvantage is that, when changing the operating site the coupling device may be moved only with a high cost of labor.

Furthermore, a device is known (from U.S. Pat. No. 3,195,562), in which a coupling device is movable parallel to a pressure line which may be coupled with discharge valves at the pressure line. For this purpose a double-sided, inclined guide conduit or channel is provided for each coupling, through which a pretensioned plunger for opening the discharge valve is mounted in the coupling device. The structural costs or expenditures in this embodiment are considerable and large displacement forces are required in the area of the discharge valve.

BRIEF SUMMARY OF THE INVENTION

It is an object of the invention to design a device of the aforementioned type in such a manner that the coupling in longitudinal direction of a pressure line is made possible with low structural costs, to achieve a higher degree of operational safety, with a high degree of operating comfort and a high degree of economics.

This object of the invention is obtained by providing the coupling device with a coupling element which is guided on the line and is provided with automatically sealing coupling means in the coupling position, with the discharge valve at the pressure side for an automatic alignment with the orifice, and actuating means which act upon the discharge valve or its pre-control, respectively, in the coupling position of the coupling element.

BRIEF DESCRIPTION OF THE DRAWING

The invention is shown in the accompanying drawing, in which:

FIG. 3 is a cross-section of a discharge valve of the device in accordance with FIG. 1;

FIG. 4 is a cross-section through a different embodiment of the discharge valve;

FIG. 5 is a schematic view of the arrangement of the discharge openings in the pressure line;

FIG. 6 is a schematically shown cross-section of a further embodiment of the inventive device;

DETAILED DESCRIPTION OF PREFERRED EMBODIMENTS

Figure 1:
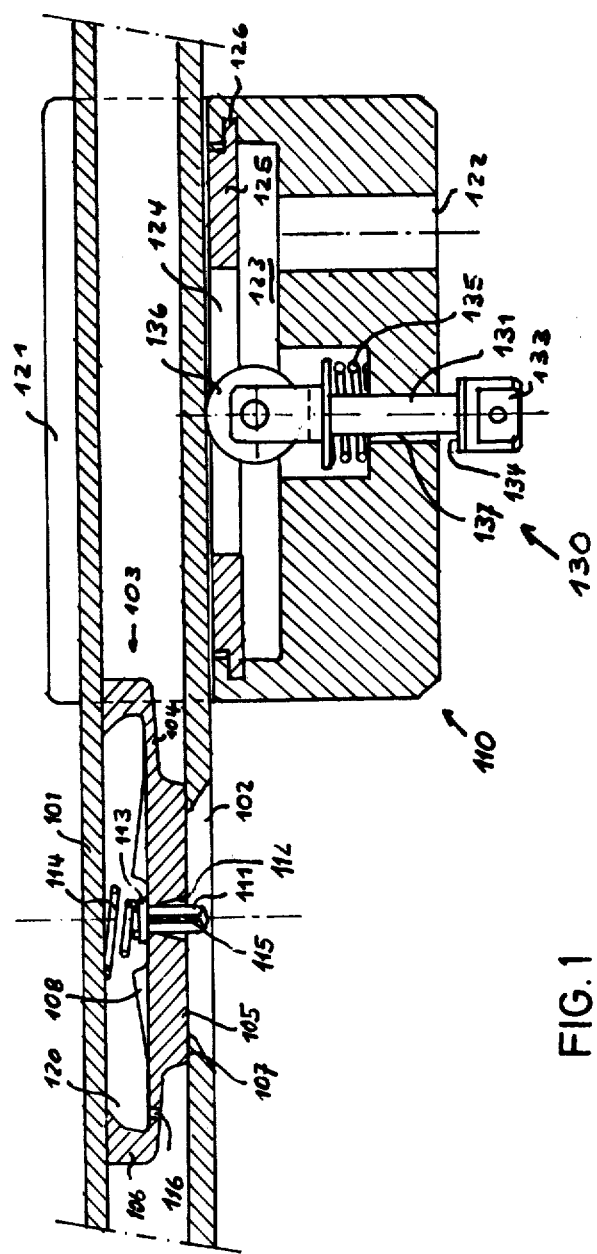
FIG. 1 is a schematically shown cross-section of an inventive device in non-coupled operating position.
Figure 2:
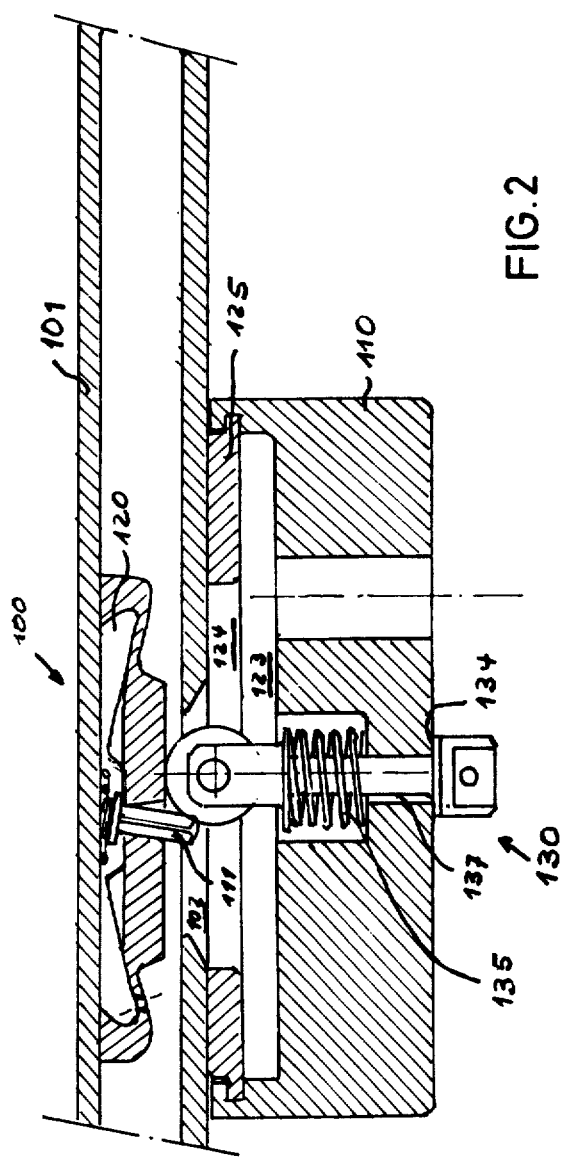
FIG. 2 is the device in accordance with FIG. 1 in coupled operating position.
Figure 10:
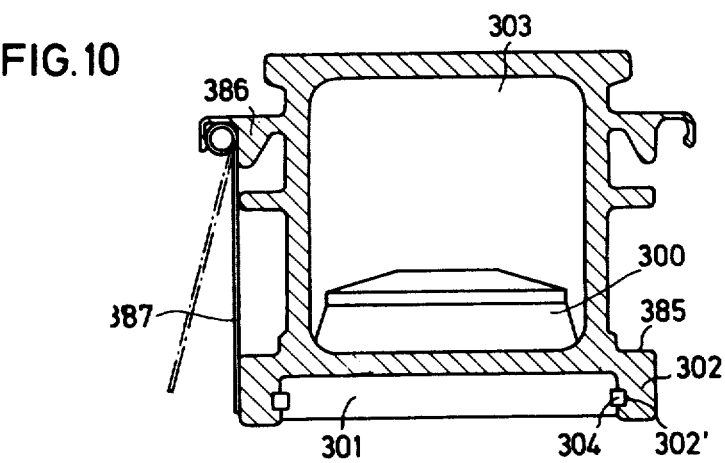
FIG. 10 is a cross-section of a line receiving a discharge valve in accordance with FIG. 7.

FIGS. 1 and 2 show a pressure line or conduit 101 consisting of a square-shaped pipe (FIGS. 3, 4 and 10) on which a coupling device is slideably guided with a coupling element 110 which can be brought into active connection with a discharge valve 100 of line 101.

The discharge valve 100, of which there are usually several present in pressure line 101 (See FIG. 5), is provided with a slot-like discharge opening 102 which penetrates the wall of line 101. Opening 102 expands conically to the outside, so that the inner shoulder forms a valve seat 107 for a movable closing or locking body 103 which consists of a rubber elastic material and a closing or locking member 105 which is supported by a membrane part 104. An edge portion 106 extends upwardly from the membrane portion 104 with which the closing element 103 is supported against the upper wall as well as against the side walls (FIGS. 3 and 4) of line 101, thus defining a chamber 120. The actual closing body 105 in the range of membrane part 104 may be pressed upwardly into chamber 120 (FIG. 2), so as to lift the closing part 105 from valve seat 107. Inner ribs 108 at the closing element 105 form a stroke limit.

Furthermore, the closing element 105 of locking body 103 is centrally penetrated by a pre-control valve 111, which with its free end extends over the closing face of the closing element 105 but is sunk with respect to the lower outer face of line 101. The pre-control valve 111 is tiltably mounted at least along the longitudinal line axis in closing member 105. For this reason, a bore 112 expands conically downwardly in closing element 105. The pre-control valve 111 engages with a shoulder 113 in the locking or closing position in sealing engagement on the inner wall of the closing element 105 and is biased by a spring 114, for example, a spiral or a leaf spring (FIG. 3). Grooves 115 at the shaft of the pre-control valve 111 permit a flow of the pressure medium from the chamber 120. A throttle bore 116 in membrane portion 104 is provided for the flow of the pressure medium into the inside of closing body 103 or into chamber 120, respectively. The flow cross-section of the throttle bore 116 is substantially smaller than the one of the flow grooves 115 so as to achieve an immediate pressure drop in chamber 120 when opening the pre-control valve 111.

When the line 101 is under pressure only a small force is required for opening discharge valve 100, so as to open the pre-control valve 111 by tilting or pressing, whereby the pressure drop which is generated in the chamber 120 causes closing member 105 to open automatically and/or lifts under the influence of a low force from the outside, thus releasing the slot like opening 102 through which the pressure medium may discharge from pressure line 101. When the opening force on the pre-control valve 111 is released and also the retention force on closing member 105, a new pressure builds in chamber 120 through bore 116 after the pre-control valve 111 returns to its closing position, whereby this pressure acts as a locking or closing pressure on the closing element 105 of closing element 103.

The coupling element 110 acts for opening the discharge valve 100 and for coupling to a branchline. This coupling element is provided with a carriage guide 121 which surrounds the line 101 in such a manner (see FIG. 3) that an easy displacement is assured. The coupling element 110 is provided with an orifice 122 which is connectable with a branchline and which can be connected through pressure chamber 123 and a coupling opening 124 with opening 102 of the discharge valve 100, as shown in detail in FIG. 2. The coupling opening 124 is disposed in a membrane 125 mounted in the pressure chamber 123 and adapted to engage the wall of the pressure line 101 at one side. The membrane 125 is positively mounted in a groove 126 in the wall of pressure chamber 123. The coupling 124 in membrane 126 is also in the form of a slot, when the pressure medium flows into the coupling opening 124 it exerts a pressure on the inner face of membrane 125 which presses the membrane 125 against the lower wall of line 101.

Furthermore, the coupling element 110 supports an actuating member 130 which is influenced from the outside for opening the pre-control valve 111 and if need be the closing element 105 of discharge valve 100 when moving over the discharge valve with the coupling device. The actuating member 130 is a pin 131 which extends from below into pressure chamber 123 and is guided in a bore 132 ending in an actuating head 133 with a seal shoulder 134 and is also under the influence of a pressure spring 135. At one end pin 131 supports a roller 136 which penetrates the coupling opening 124 but which can roll on the lower jacket face of pressure line 101 when displacing coupling element 110. As can be seen in FIG. 1, the pressure chamber 123 is in connection with the ambient through an open groove 137 in bore 132 of pin 131. In the closed or locked position groove 137 is closed at the head 133 of pin 131 by sealing shoulder 134 (FIG. 2).

For establishing a coupling the coupling element 110 is manually pushed into the position shown in FIG. 2. This can be done by a rapid hand movement without taking into consideration an exact coupling position, since the described device automatically defines the coupling position and fixes it unmovably. When, during this displacement, roller 136 gets into the range of slot 102 the roller may fall into this slot by the influence of spring 135 and thereby tilt the pre-control valve 111, so that the discharge valve 100 achieves an immediate open position and the pressure medium flows into coupling opening 124. A pressure builds up in pressure chamber 123 which presses the membrane 125 with such a high pressure against the jacket of the pressure line 101 that a manual displacement of the coupling element 110 on the pressure line 101 is made impossible. At the same time, a pressure-tight coupling is assured.

For closing the valve 100 or for displacing the coupling element 110, respectively, the actuating member 130 is pulled downwardly against the effect of spring 135, whereby the pre-control valve 111 returns into its closing position and thereby closes discharge valve 100. Simultaneously, the actuation of pin 131 opens the relief opening 137, whereby the inner face of the membrane 125 is relieved due to the pressure drop in the pressure chamber 123, so that the coupling element can again be easily displaced. In the same manner, the coupling element 110 may be pushed over a discharge valve 100 without triggering and opening the discharge valve.

The actuating member 130 may also be differently constructed, for example, as a pin which is actuated by a pressure key whereby the pin supports an elastic guide. The discharge openings 102 may have different shapes. The coupling element may be constructed for carrying out a simultaneous actuation of a plurality of discharge valves.

FIG. 3 shows the cross-section of line 101 in the form of a flat rectangle with a mounting flange 201'. Since the closing body 103 has a relatively flat cross-sectional shape for stability reasons, a hollow support member 150 may be provided in the area of each closing body 103 or a double pipe with apertures 151 between the individual discharge valves, when a high capacity cross-section is required, as seen in FIG. 4.

The described coupling procedure is carried out in a fraction of the second, whereby the required actuating force must merely correspond to the displacement resistance force of the coupling element before coupling, and amount to about 0.2 kp.

The arrangement shown in FIG. 6 is provided with a line 201, for example, a square-shaped pipe, on which a coupling element 210 is guided and which is coupled to a discharge valve 200 having a slot-like opening 202 the inner shoulder of which forms a valve seat 207 for a closing or locking element 203 with a spring elastic roller membrane 204 and a sealing plate 205 coupled therewith. The edges 206 of roller membrane 204 are connected with line 201 by screws 208.

The coupling element 210 acts for coupling a branchline and is guided on line 201, the coupling element being provided with a pressure chamber 223 with an orifice 222 and a membrane 225 with a discharge opening 224. The membrane is positively mounted in a groove 226 of pressure chamber 223. When opening the discharge valve 200 the flowing medium presses the membrane 225 pressure-tight against the lower wall of line 201.

Furthermore, the coupling element supports an actuating member which is influenced from the outside for engaging the sealing plate 205 when moving over the discharge valve 200 with the coupling element 210.

The actuating member 230 is provided with two adjacent pins 232 supported by a slide 231. The perpendicularly guided slide 231 is under the influence of a spring 233 and presses it against the closing element 203. When missing an outer force P the slide 231 moves into its upper extreme position, in which pins 232 open the closing element 203. In this position, a pressure relief bore 235 which is connected with chamber 223 is closed. The pins 232 support a pressure ring 236 which engages the membrane 225 when lifting the pins 232. When the pin 231 is retracted the coupling element 210 can be easily displaced on line 201 and can be moved into a new coupling position. One does not have to take into consideration an exact coupling position, since the coupling position is automatically defined and fixed. This is already described with respect to the embodiments of FIGS. 1 and 2.

The actuating means may also be differently shaped, as shown in the embodiments of FIGS. 7-10.

Figure 7:
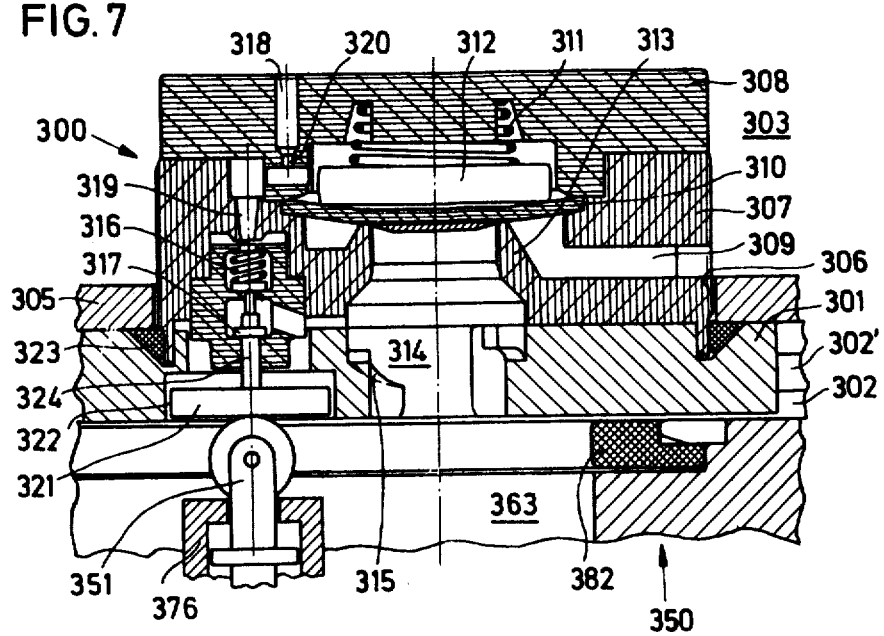
FIG. 7 is a perpendicular section through a precontrolled discharge valve.

The discharge valve in accordance with FIG. 7 is mounted on an insert plate 301 which is inserted between two ribs 302 of a square-shaped pipe 303 and is retained by a snap ring 304 which may be inserted laterally. The insert plate 301 engages the bottom 305 of the square-shaped pipe 303, while the discharge valve 300 extends into the inside of pipe 303 through an opening 306 in bottom 305. The discharge valve 300 is provided with a valve element 307 and a valve lid 308, these parts being coupled with insert plate 301, in a manner not shown. A line or conduit 309 forms the connection to the inside of pipe 303, this line being closed by a membrane 310 disposed between valve element 307 and valve lid 308. The membrane is pressed against a valve seat 313 in valve element 307 by weak springs 311 via a bottom 312. The valve seat surrounds discharge 314 which extends through insert plate 301. The discharge 314 is provided with cams 315 of a bayonet lock in insert plate 301 with the aid of which a conduit is directly coupled to discharge 314.

The opening means for opening the discharge valve are a pre-control valve 317 biased by a spring 316, pre-control lines 318, 319 with a throttle connection 320 and a push rod 320 with a guide 321. When opening the pre-control valve 317 a vacuum is generated at the lid side of membrane 310 due to the throttle connection 320 so that the lifting of the membrane 310 is effected as well as the connection between line 309 and discharge 314.

The pre-control valve 317 is mechanically opened by lifting the push rod 324 which extends through the area of a recess 322. This is carried out by a spring-biased sensor 351 in coupling element 352. The advantage of this discharge valve 300 resides in the fact that its servicing is very simple. After removing the snap ring 304, the insert plate 301 can be removed, the valve can be serviced and reinserted. For sealing pipe 303 to the outside a soft seal 323 is provided. Without any difficulties a filter may be installed into the pre-control line 318. The contamination danger of the pre-control is already low due to the fact that the orifice of the pre-control line 318 is mounted above bottom 305.

Figure 8:
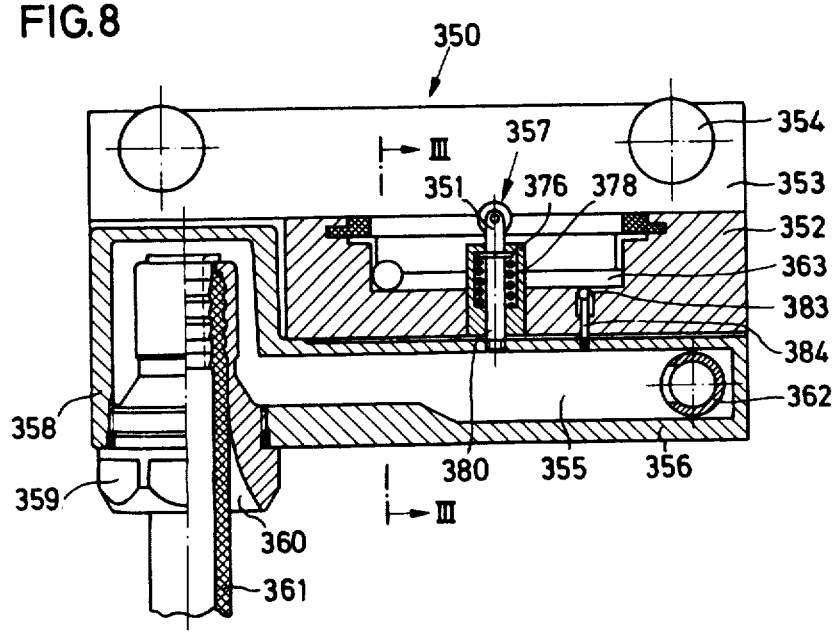
FIG. 8 is a perpendicular view of a coupling means which cooperates with the discharge valve according to FIG. 7.
Figure 9:
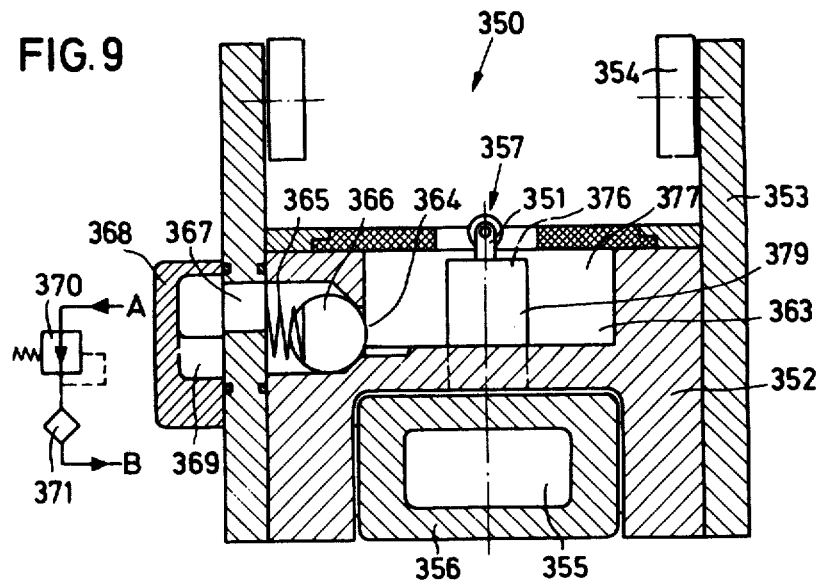
FIG. 9 is a sectional view along lines III—III in FIG. 2.

FIGS. 8 and 9 show the coupling device 350 which is longitudinally displaceable along line 303. The coupling device is provided with a square-shaped coupling element 352, two side plates 353 with rollers 354 which are mounted at both sides of the coupling element 352, a pivot arm 356 provided with a through-put channel 355 mounted in the coupling element 352, and at the side of line 303 actuating means 357 for opening the pre-control valve 317. At its free end pivot arm 356 is provided with a coupling head 358 in which a pipe coupling 359 with an orifice 360 for receiving a hose 361 is screwed.

The pivot arm 356 is pivotable around a hollow pin 362 through which the pressure medium flows from pipe 303 through pressure chamber 363 and line 365. In the proximity of the bottom of pressure chamber 363 a line orifice 364 is provided through which the pressure medium is supplied from line 303 to hose 361. The connection between the orifice 364 and the hollow pin 362 may be used for installing different line components. As can be seen from FIG. 9, orifice 364 forms the seat of a check ball 366 biased by a spring 365. The pressure medium flows through an opening 367 in the side plate 353 into a hollow flange 368 mounted at the side plate 353, whereby the recess of the hollow flange forms an outer disposed connecting line 369 between orifice 364 and the discharge into hollow pin 362. This connection which is disposed at the outer side of side plate 353 may be used to install line components, for example, a pressure control valve 370 and a lubricator 371, as shown on left side of FIG. 9. The input A constitutes the supply line from orifice 364 and B the discharge into hollow pin 362. It is also possible to install further line components or only one single line component.

The actuating means 357 which are provided in the pressure chamber 363 are provided with an insert element 376 wherein a spring 378 presses against a actuator 351 which is coupled by a pull rod 380 with pivot arm 356. When pulling hose 361 the pivot arm 356 is pivoted away from pipe 303 and the actuating means 357, i.e., sensor 351, is also moved away from pipe 303, so that the opening means of the discharge valve are not actuated and the discharge valve remains closed when the coupling device 350 moves. When the pivot arm 356 is not pulled, the pre-control valve 317 is opened when being flush or in alignment with actuator 351. The pressure medium which flows into pressure chamber 363 acts on the rear side of a membrane 382 which is pushed against the insert plate 301, thus establishing a pressure-tight seal between the insert plate 301 and coupling device 350.

For detaching the coupling, the pressure chamber 363 is vented through a vent valve 383 which is actuated by a buffer rod 384 which is coupled with pivot arm 356.

The individual parts of the discharge valve and the coupling device may consist partly of plastic or metal. The square-shaped pipe 303 is preferably an extruded profile at which the ribs 302 for receiving the insert plate 301 are provided. The ribs 302 from at their upper side a running face 385 for rollers 354 of coupling device 350. A further rib 386 may be provided on line 303 for receiving curtain 387 (FIG. 4).

The operation of the coupling device with the aid of hose 361 is a particularly simple solution. By an inclined pulling of hose 361 the coupling is detached, i.e., a coupling is prevented and the coupling device 350 is displaced on line 303 without opening the discharge valve. When the coupling device 350 is moved without pulling hose 361, the coupling of orifice 364 or hose 361 to line 303 is carried out.

In the described embodiments the coupling means, in particular the membranes for the pressure side of the line of the pressure chamber, are mounted in the coupling element. However, it is also possible to arrange these membranes within the pressure line. This means, that one membrane is required for each discharge valve. An eventual wear and tear of the membrane is such distributed to a plurality of membranes.

If a pressure indication for the branchline is required, a manometer may be mounted on pivot arm 356 (FIG. 8), which can be read from below.

It is to be understood that the invention is not limited to the described embodiments, but only by the scope of the appended claims.

What is claimed is:

1. A device for detachably coupling the orifice of a branchline to a conduit carrying a pressure medium having a plurality of discharge valves disposed spaced apart from each other along said conduit, each of said valves having a discharge opening, and a closing element for each of said openings, a coupling device having said orifice disposed therein, said coupling device being longitudinally displaceable along said conduit and connectable with the conduit by opening one of the discharge valves, said coupling device being guided on said conduit and having sealing and coupling means becoming effective automatically in the coupling position with the discharge valve being in alignment with the orifice, and actuating means effective to open by contact a respective one of said discharge valves in the coupling position of the coupling device, wherein each discharge valve has a discharge opening with a valve seat for said valve closing element, said closing element at least partially being made of an elastic material, said closing element having an inner surface disposable to the pressure in said conduit to establish sealing of the discharge opening in its closing position, and said actuating means being capable of taking operative connection with said valve closing element in said coupling position so as to transfer the closing element in its open discharge position, and a pre-control valve forming a bypass to said closing element, a spring biasing said pre-control valve, said pre-control valve being adapted to be actuated by said actuating means on said coupling element.

2. A device according to claim 1, in which said pre-control valve extends through said valve closing element.

* * * * *